United States Patent [19]
Nyberg, deceased et al.

[11] 3,717,173
[45] Feb. 20, 1973

[54] CONNECTING ASSEMBLY FOR DISH- OR CLOTHES WASHING MACHINES

[75] Inventors: Carl Erik Josef Nyberg, deceased, late of Skovde, Sweden; Anna Ingegerd Nyberg; Karl Ove Nyberg; Bo Erik Nyberg; Kent Olof Nyberg; Inger Margaretha Allerbjer (nee Nyberg), all of Skovde, Sweden Heirs

[73] Assignee: Karl Ove Nyberg, Skovde, Sweden
[22] Filed: Jan. 8, 1971
[21] Appl. No.: 104,892

[30] Foreign Application Priority Data

Jan. 13, 1970 Sweden ................................. 344/70

[52] U.S. Cl. ...................... 137/562, 137/615, 285/8
[51] Int. Cl. .............................................. F16k 11/00
[58] Field of Search ..137/562, 594, 801, 615; 285/8, 285/131, 137

[56] References Cited

UNITED STATES PATENTS

| 2,422,060 | 6/1947 | Wotring | 285/8 |
| 3,055,392 | 9/1962 | Barotz | 137/562 |
| 1,583,173 | 5/1926 | Price et al. | 137/615 |
| 3,125,360 | 3/1964 | Ulrich | 285/137 |
| 3,011,725 | 12/1961 | Shames et al. | 137/562 X |
| 3,064,678 | 11/1962 | Shames et al | 137/562 |
| 3,529,775 | 9/1970 | Eckerle | 137/562 X |
| 3,559,681 | 2/1971 | Jarvis et al. | 285/8 |

Primary Examiner—William R. Cline
Attorney—Bauer & Goodman

[57] ABSTRACT

Connecting assembly for connecting a dish- or clothes washing machine to a faucet above a sink, basin or the like, the connecting assembly being rotatably connectible with the outlet part of the cock body by means of a swivel device such as an automatic coupling having a coupling sleeve and a nipple in order to make possible rotation of said connecting assembly around the center axis of said swivel device to a desired angular position. Said connecting assembly comprises a hollow journal part which is provided with a through-flow channel and, at its one end, is connected with said swivel device and which extends laterally out from the center axis of said swivel device and which is provided at its outlet end with a hose nipple for connection of the water inflow hose.

The journal part is externally cylindrical along a portion of its length in order to form a bearing for a hub that supports an arm extending out from said hub and having a water outlet channel which opens at the outer end of said arm in order to direct the waste water down into the sink in the direction adjusted for by the angular adjustment of said journal part around the swivel axis and the angular adjustment of the hub around the center axis of said journal part. The arm supports a hose nipple that is connected with the outlet channel in said arm and is adapted to be connected to the outflow hose of the machine.

8 Claims, 4 Drawing Figures

PATENTED FEB 20 1973 3,717,173

CONNECTING ASSEMBLY FOR DISH- OR CLOTHES WASHING MACHINES

The present invention relates to a connecting assembly for connecting a dish- or clothes washing machine to a water faucet above a sink, basin or the like.

The object of the invention is to provide in a simple manner a large number of possibilities of adjusting the connecting assembly in order to best adapt its position to the shape of the faucet assembly and to simultaneously make possible complete control of the direction of the flow of the waste water into the sink. This is achieved with a connecting assembly which, according to the invention, has characterizing features as defined in the annexed claims. The position of the connecting assembly can be adjusted by rotating it around two shafts that are preferably perpendicular to each other. This results in a large number of adjusting possibilities which are further increased if the connecting assembly is secured on an extra cock body of a known type which is rotatably adjustable and secured on the ordinary cock body and which is provided with a two-way valve for leading the water alternatively to a mixer valve or to the machine via the connecting assembly.

An embodiment of the invention will be described below with reference to the appended drawings.

DETAILED DESCRIPTION OF ILLUSTRATED EMBODIMENT

Figure 1:
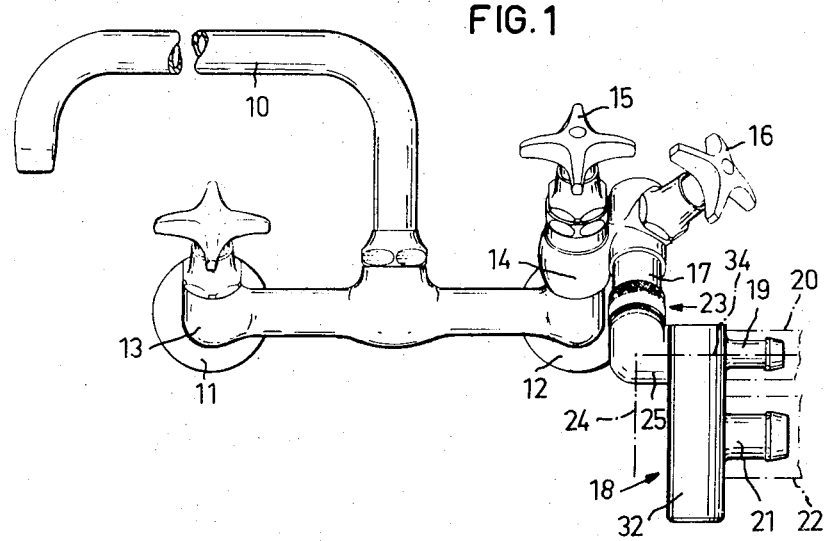
FIG. 1 shows a mixer valve that is connected with a hot water faucet and a cold water faucet. The cock body of one faucet supports an extra cock body having two faucets. The outlet part of one faucet supports a connecting assembly according to the invention.

Two cock bodies 13, 14 are connected to the two water pipes 11, 12. The cock bodies 13, 14 have valves which are adjusted with faucets. One cock body 14 can be locked in different rotating positions relative to the faucet assembly and supports the ordinary stop cock 15 and an extra cock 16 which regulates the flow through the outlet part 17 of the double cock body 14. When the tap 15 is open and the tap 16 is closed, the water runs to the mixer valve 10. When the tap 15 is closed and the tap 16 is open, the water runs to the outlet part 17 and, via a connecting assembly 18 to a nipple 19 that is connected with the inflow hose 20 of the machine.

The connecting assembly is provided with an additional nipple 21 which is connected to the outflow hose 22 of the machine.

The connecting assembly is connected with the outlet part 17 by means of a swivel coupling 23. In the illustrated example, this connection of an automatic coupling consists of a nipple and coupling sleeve of a known type.

By means of the swivel connection the connecting assembly is rotatable about the center axis of the swivel coupling. This is indicated by the broken line in FIGS. 1 and 2.

The connecting assembly consists of two main parts. One part includes a hollow journal-like part 25 in which a through-flow channel 26 is provided. At one end, the channel 26 is connectable to the outlet part 17 of the cock body, while at the other end, the channel merges into the hose nipple 19.

Figure 3:
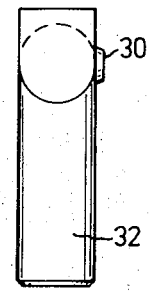
FIG. 3 is an end view.
Figure 4:
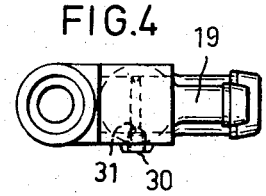
FIG. 4 is a view from above.

The journal-like part 25 is cylindrical along a portion 28 of its length in order to form a bearing for a hub 29. The hub 29 is axially fixed on the hollow journal 25 by means of a locking screw 30 (FIGS. 3 and 4) which, with its end 31, engages an annular groove 25a on the journal.

A radial arm 32 projects out from the hub 29. Arranged in this arm is an outlet channel 33 which is connected to the hose nipple 21 for the outflow hose, said nipple 21 being arranged on the side of the arm 32.

Because the hub 29 is rotatably adjustable around the center axis 34 of the journal 25, the arm 32 can be aligned as desired so that the water running off at the end of the channel 33 is directed downward into the sink.

Figure 2:
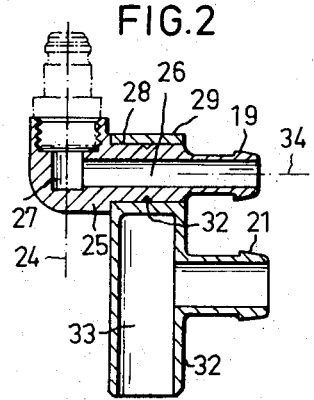
FIG. 2 shows an axial section through the connecting assembly.

As is evident from FIGS. 1 and 2, the two hose nipples 19, 21 lie relatively close to, and are essentially parallel to each other. This makes possible the use of two hoses 20, 22 which are cast in the same mold. Such a double hose is easier to handle and connect than two separate hoses. However, two separate hoses could also be used with the shown connecting assembly.

Both main parts of the connecting assembly could advantageously be molded in plastic.

What is claimed is:

1. Connecting assembly for connecting a dish- or clothes washing machine, or the like, to a faucet, said connecting assembly including:

a rotatably adjustable double cock body (14) connected to a fluid supply and containing two outlet parts and two taps (15,16) for adjusting fluid flow to respective outlet parts;

a swivel device (23) having a coupling sleeve and a nipple rotatably coupled to said sleeve, said swivel device being coupled with a rotatably adjustable outlet part of said double cock body (14) of said faucet, and having a central swivel axis (24);

a hollow journal-like member (25) having a through-flow channel (26) therein, said hollow journal-like member (25) being connected at one end thereof to said swivel device (23) so as to swivel about said swivel axis (24), said hollow journal-like member (25) further including an inlet hose nipple (19) at its other end for connection of the water inflow hose of said machine, and an external cylindrical surface (28) along a portion of its length to form a bearing surface;

a hub (29) rotatably mounted on said external cylindrical surface (28);

an arm (32) extending out from said hub (29) and having a water outlet channel (33) therein which opens at the outer end of said arm to direct waste water to a drain means, the direction of waste water ejection being adjusted by angular adjustment of said hollow journal-like member (25) around said swivel axis of said swivel device and by the angular adjustment of said hub (29) around the central axis (34) of said hollow journal-like member (25); and an outlet hose nipple (21) on said arm (32) and in communication with said outlet channel in said arm (32) and being adapted to be connected to the out-flow hose of said machine.

2. Connecting assembly according to claim 1 wherein said hollow journal-like member (25) extends from said swivel device (23) laterally with respect to said swivel axis (24) of said swivel device.

3. Connecting assembly according to claim 1 wherein said hollow journal-like member (25) extends from said swivel device (23) with the central axis (34) thereof substantially perpendicular to said swivel axis (24).

4. Connecting assembly according to claim 3 wherein said inlet and output hose nipples extend substantially perpendicularly relative to said swivel axis.

5. Connecting assembly according to claim 1 wherein said coupling sleeve of said swivel device is fixedly connected in fluid communication with said one outlet part of said double cock body.

6. Connecting assembly according to claim 1 wherein said inlet and outlet hose nipples extend substantially perpendicularly relative to said swivel axis.

7. Connecting assembly according to claim 1 including a locking screw (30) carried by said hub (29) and engaging said hollow journal-like member (25) to lock said hub relative to said hollow journal-like member.

8. Connecting assembly according to claim 7 including an annular groove (31) formed in said external cylindrical surface (28) of said hollow journal-like member, said screw (30) being threaded on said hub and engaging said annular groove.

* * * * *